United States Patent
Töpperwien et al.

(10) Patent No.: US 12,461,045 B2
(45) Date of Patent: Nov. 4, 2025

(54) PROCEDURE FOR GENERATING FLUOROSCOPIC IMAGES FOR THE RECONSTRUCTION OF A VOLUME IN A FLAT OBJECT USING AN X-ray SYSTEM

(71) Applicant: Comet Yxlon GmbH, Hamburg (DE)

(72) Inventors: Mareike Töpperwien, Hamburg (DE); Philipp Klein, Hamburg (DE)

(73) Assignee: Comet Yxlon GmbH, Hamburg (DE)

( * ) Notice: Subject to any disclaimer, the term of this patent is extended or adjusted under 35 U.S.C. 154(b) by 185 days.

(21) Appl. No.: 18/507,218

(22) Filed: Nov. 13, 2023

(65) Prior Publication Data
US 2024/0159691 A1 May 16, 2024

(30) Foreign Application Priority Data
Nov. 14, 2022 (DE) .................... 10 2022 129 970.8

(51) Int. Cl.
  *G01N 23/04* (2018.01)
  *G01N 23/046* (2018.01)
(52) U.S. Cl.
  CPC ......... *G01N 23/043* (2013.01); *G01N 23/046* (2013.01); *G01N 2223/3303* (2013.01); *G01N 2223/427* (2013.01)
(58) Field of Classification Search
  CPC ............... G01N 23/043; G01N 23/046; G01N 2223/3303; G01N 2223/427; G01N 23/223; G01N 23/083; G01N 2223/1016; G01N 2223/401; G01N 2223/406; G01N 2223/633; A61B 6/032; G01B 15/00
  See application file for complete search history.

(56) References Cited

U.S. PATENT DOCUMENTS

2009/0074136 A1* 3/2009 Kamegawa .......... G01N 23/046
                                                              378/98.3
2020/0326289 A1    10/2020 Takeda

FOREIGN PATENT DOCUMENTS

JP          H06-94651 A      4/1994
WO        2021/072229 A1    4/2021

OTHER PUBLICATIONS

Examination Report in German Appl. No. 10 2022 129 970.8 mailed Mar. 11, 2023, 2 pages.

(Continued)

*Primary Examiner* — Kiho Kim
(74) *Attorney, Agent, or Firm* — Kowert, Hood, Munyon, Rankin & Goetzel, P.C.; Gareth M. Sampson; Dean M. Munyon

(57) ABSTRACT

The present disclosure relates to a procedure for generating fluoroscopic images for the reconstruction of a volume in a flat object using an X-ray system, which has three imaging components, namely a tube, a detector and a manipulator, located between them, on which the object is fixed. The object extends multiple times further in two dimensions than in its third dimension. The tube has a focus, which, in a central position of the tube, forms the coordinate origin of a Cartesian coordinate system, and which emits an X-ray. The vector from the tube through the volume forms the x axis of the coordinate system and the z axis is perpendicular to a vector formed through the thickness. The manipulator is rotated about a rotational axis, which is perpendicular to the x axis, runs parallel to the z axis and is displaceable parallel to the x axis.

20 Claims, 5 Drawing Sheets

(56) References Cited

OTHER PUBLICATIONS

Yanic Simo et al., "Non-uniform projection angle processing in computed tomography," In: Proceedings of SPIE 8494 (2012), 7 pages.
Search Report in GB Appl. No. 2317376.8 mailed May 3, 2024, 4 pages.

\* cited by examiner

PROCEDURE FOR GENERATING FLUOROSCOPIC IMAGES FOR THE RECONSTRUCTION OF A VOLUME IN A FLAT OBJECT USING AN X-ray SYSTEM

PRIORITY CLAIM

The present application claims priority under 35 U.S.C. § 119 to German Patent Application No. DE 10 2022 129 970.8, filed Nov. 14, 2022, the disclosure of which is incorporated by reference herein in its entirety.

TECHNICAL FIELD

The present disclosure relates to a procedure for generating fluoroscopic images for the reconstruction of a volume in a flat object using an X-ray system, which has a tube, a detector and an object located between them.

DESCRIPTION OF STATE OF THE ART

The area of use for the disclosed embodiments is X-ray based material testing. Industrial concerns such as the automobile industry or electronics manufacturers utilize X-ray systems in the context of X-ray based material testing in order to test the properties of objects (in particular component parts). Here, the use of X-rays for imaging provides the possibility of examining concealed structures without destroying the object.

The testing is carried out in an X-ray system which have an X-ray tube (called tube in the following) and an X-ray detector (called detector in the following) as imaging system. The object to be examined is arranged between them on a manipulator. Some or all of the three above-named components are movable translationally and/or rotationally—depending on the X-ray system. The whole device is located in a radiation protection cabin (called cabin in the following). As the geometry of the pictures taken with the X-ray system depends on the focus of the tube, in the following the tube is also referred to merely as focus.

In the destruction-free testing of large flat component parts, such as for example printed circuit boards, a very high magnification and thus resolution can be achieved in 2D pictures. However, as this merely involves projections through the whole object, all of the structures contained in the object overlap in the recorded image and it is not possible to draw any conclusions about the position of the individual components in terms of depth. Conventional computed tomography, in which the object is observed from many different angles distributed over 360°, provides a possibility of obtaining additional depth information. From these pictures, the three-dimensional object is then reconstructed, with the result that the location of all components in space can be determined. However, as the object needs to be rotated once during this recording without it colliding with the components of the system, it is not possible to achieve as high a magnification M as in 2D testing, as this is determined by the focus-to-detector distance (FDD) and the focus-to-object distance (FOD) (M=FDD/FOD). For the 2D testing, the thickness of the object is thus decisive for the achievable resolution, whereas in the case of CT pictures above all the width of the object has a limiting effect.

In the context of this application, by an object is meant an article which extends multiple times further in two dimensions (the surface area, which comprises the above-named width in one direction) than in its third dimension—referred to as thickness above—which is referred to as depth in this application.

In order to make a better magnification of the object, compared with conventional CT, possible—as a rule only information from regions of particular interest (the ROI=Region of Interest), which are referred to as volume in the context of this application, is—laminography procedures are known from the state of the art:

In rotational laminography, the flat object is rotated once fully about an axis which is perpendicular to the object surface and which is inclined relative to the optical axis (either by actually tilting the rotational axis or by tilting the detector). Compared with conventional CT, a smaller FOD and thus a higher magnification can thereby be achieved. However, the resultant data set is not complete and artefacts (so-called little hats) occur in the reconstructed volume, which lead to a poorer resolution in terms of the depth than in the lateral direction. The bigger the laminography angle, the better the depth resolution. Compared with conventional CT, fewer projections (pictures) are needed for a good sampling, with the result that a smaller dose and more throughput is possible.

Further laminography procedures are circular/elliptical laminography, translational laminography, swing laminography and linear laminography.

It is likewise known from the state of the art to carry out a CT procedure with variable magnification for testing composite materials. In this case, the magnification, which is too low in the case of conventional CT, can be compensated for in that at the irradiation angles at which a collision between tube and object would occur the FOD is increased, at the expense of the magnification, to such an extent that the collision can be prevented. During the scan, depending on the projection, different magnifications thus occur, which then has to be taken into account in the reconstruction of the volume from these projections. In contrast to laminography, here the entire Fourier space is sampled, with the result that the typical little hat artefacts can be prevented. In this case, the change in the FOD takes place along a sine curve, which is defined by the maximum measurements of the object, and projections are recorded at regular angle increments.

SUMMARY OF DISCLOSED EMBODIMENTS

The object of the present disclosure is to provide a procedure with which both a high resolution, comparable to 2D testing, can be achieved and at the same time information can be obtained about the position of the individual components of the object in terms of depth, comparable to conventional CT, and in addition, however, the throughput is increased compared with conventional CT and the dose burden is reduced.

This object is achieved according to the present disclosure by a procedure with the features of the appended claims. Advantageous designs are specified in the dependent claims, in particular the object is an electronic component part, such as for example a printed circuit board.

According to various embodiments, the object is achieved by a combination of features which include, among other things, the fact that the distance between the tube and the rotational axis is altered such that when the object is rotated about the rotational axis the object has as small as possible a distance to the tube at every angle of rotation, wherein the distance does not fall below a definable minimum distance. This corresponds to the above-described method with variable magnification which is known from the state of the art for testing composite materials. The magnification is thereby improved compared with conventional CT. Through the further feature that the fluoroscopic images are made at predefinable angles of rotation and the angle increments between neighbouring predefinable angles of rotation are larger in the case of smaller distances of the rotational axis from the tube than in the case of larger distances of the rotational axis from the tube, the number of fluoroscopic images, and thus the time required to record the for the reconstruction of the volume, is reduced compared with the method with variable magnification, which leads to a higher throughput, and at the same time the dose burden acting on the object is reduced, as a result of which the risk of damage to the object is reduced. The quality of the reconstruction of the volume is not significantly reduced by the named distribution of the angle increments compared with a complete sampling. The geometry and possibility of movement of the individual imaging components of the X-ray system corresponds to conventional CT. The volume is arranged on the rotational axis when each fluoroscopic image is created.

The alternative solution to the problem by some embodiments is essentially the kinematic inversion of the above-described embodiments. Instead of moving the object by means of a manipulator with stationary tube and detector, the imaging system having tube and detector are moved with stationary object. The position and orientation of the tube relative to the detector do not change. The imaging system is rotated about an axis of rotation which is perpendicular to the x axis—which is formed by the vector from the focus of the tube through the volume to be examined—and runs parallel to the z axis—which is perpendicular to a vector formed through the thickness of the object. For this, the imaging system is displaceable parallel to the x axis. Like the rotational axis in the first alternative solution, the axis of rotation also extends through the volume each time a fluoroscopic image is generated.

In the first alternative solution, as a further advantageous development of the disclosed embodiments, it is provided that the object is fixed on the manipulator before the start of the procedure such that the resultant effective rotational axis lies in the volume. The procedure according to the disclosed embodiments can thereby be carried out with a very simple trajectory of the manipulator, which only needs to be moved translationally along the x axis and rotationally about its rotational axis.

An alternative advantageous development of the disclosed embodiments provides that the volume is positioned for each angle increment by means of a movement of the manipulator along the x axis and/or the y axis such that it is always located in the same place. As a result, the manipulator has to be moved on a complicated trajectory, in which translational movements along the x axis and parallel to the y axis and a rotational movement about its rotational axis must be effected in order to achieve the same effect as in the above-described embodiment. This corresponds to a movement of the object about a virtual rotational axis.

In the second alternative solution, on the other hand, only one movement explained in the preceding paragraph is advantageous. Here, the volume is positioned for each angle increment by means of a movement of the imaging system along the x axis such that the resultant effective axis of rotation lies in the volume, in particular in the centre thereof. This corresponds to a movement of the imaging system about a virtual rotational axis.

An advantageous development of the second alternative solution provides that the tube and the detector are fixed on a frame, which is rotatable about an axis oriented parallel to the z axis and is displaceable along the x axis. A comparable structure is known from medical technology, where the imaging system in CT procedures is usually attached to a gantry.

The advantageous developments of the disclosed embodiments named in the following relate to both alternative solutions.

An advantageous development of the disclosed embodiments provides that the central ray of the X-ray lies on the x axis and strikes the detector perpendicularly in a central position. The volume to be examined can thereby be optimally illuminated without information being lost on the side on which the surface area of the detector is smaller with respect to the central ray.

An alternative advantageous development of the disclosed embodiments to the development named in the preceding paragraph provides that the x axis does not strike the detector centrally. A so-called half-beam scan can thus also be carried out, in which the volume is imaged almost at the edge of the detector—the rotational axis or the axis of rotation is thus located almost on a marginal ray of the X-ray. Moreover, as large as possible an ROI with predefined magnification can be reconstructed.

A further advantageous development of the disclosed embodiments provides that the ratio between the maximum and the minimum angle increment corresponds to the ratio of the object width to the object depth, in particular corresponds to the ratio of the longer edge to the shorter edge of the surface area in the case of an object with a substantially rectangular surface area. The angle increment which an experienced person skilled in the art would set for a regular scan, thus a full rotation of the object, can be used as reference for the minimum angle increment.

A further advantageous development of the disclosed embodiments provides that the angle increments are altered with reference to the distances of the rotational axis or the axis of rotation from the tube. It is preferred here that they are altered inversely to the distances of the rotational axis or the axis of rotation to the tube. The relationship between angle increment and distance could be chosen to be for example linear or exponential. It is also possible to distribute the angle increments via a cosine function along the long and short sides, defined by the user, of the object. The effective rotational axis preferably lies in the centre of the volume. As a result, as good as possible an illumination of the volume is achieved and the reconstruction of the volume has the best possible quality.

A further advantageous development of the disclosed embodiments provides that the distance between the object and the tube for each angle increment is between 0.1 and 20 mm, preferably 1 mm. It is thereby guaranteed that the object has a small "safety distance" to the tube and the tube can in no case be damaged by the object when it is rotated. At the same time, because of the very small "safety distance", the magnification is not significantly reduced compared with the largest possible magnification (which would correspond to a distance of 0 mm).

A further advantageous development of the disclosed embodiments provides that a predefinable shortest distance between tube and rotational axis/axis of rotation is not fallen below. It can thus be ensured that the volume is imaged completely over the entire scan, even if in the case of the theoretically largest possible magnification, because of the smallest possible distance between tube and object, the detector would not be sufficient to capture the entire volume. This shortest distance is then predefined such that, even in the case of the smallest possible distance between tube and volume, the detector the fluoroscopic image of the volume lies completely on the detector.

A further advantageous development of the disclosed embodiments provides that the minimum distance is chosen to be at least large enough that the volume is always completely illuminated. In each projection, the entire volume is thus imaged and it is ensured that, at every irradiation angle, image data arise for each volume element—also referred to as voxel—and the entire volume is sampled as completely as possible.

A further advantageous development of the disclosed embodiments provides that the choice of the minimum distance and/or of the shortest distance is fixed before the start of the rotation, whereby at least the volume imaged at the minimum distance/shortest distance is imaged completely over all projections.

BRIEF DESCRIPTION OF THE FIGURES

Further details and advantages of the disclosed embodiments are now explained in more detail with reference to embodiment examples represented in the drawings. There are shown in.

DETAILED DESCRIPTION OF EXEMPLARY EMBODIMENTS

Figure 1:
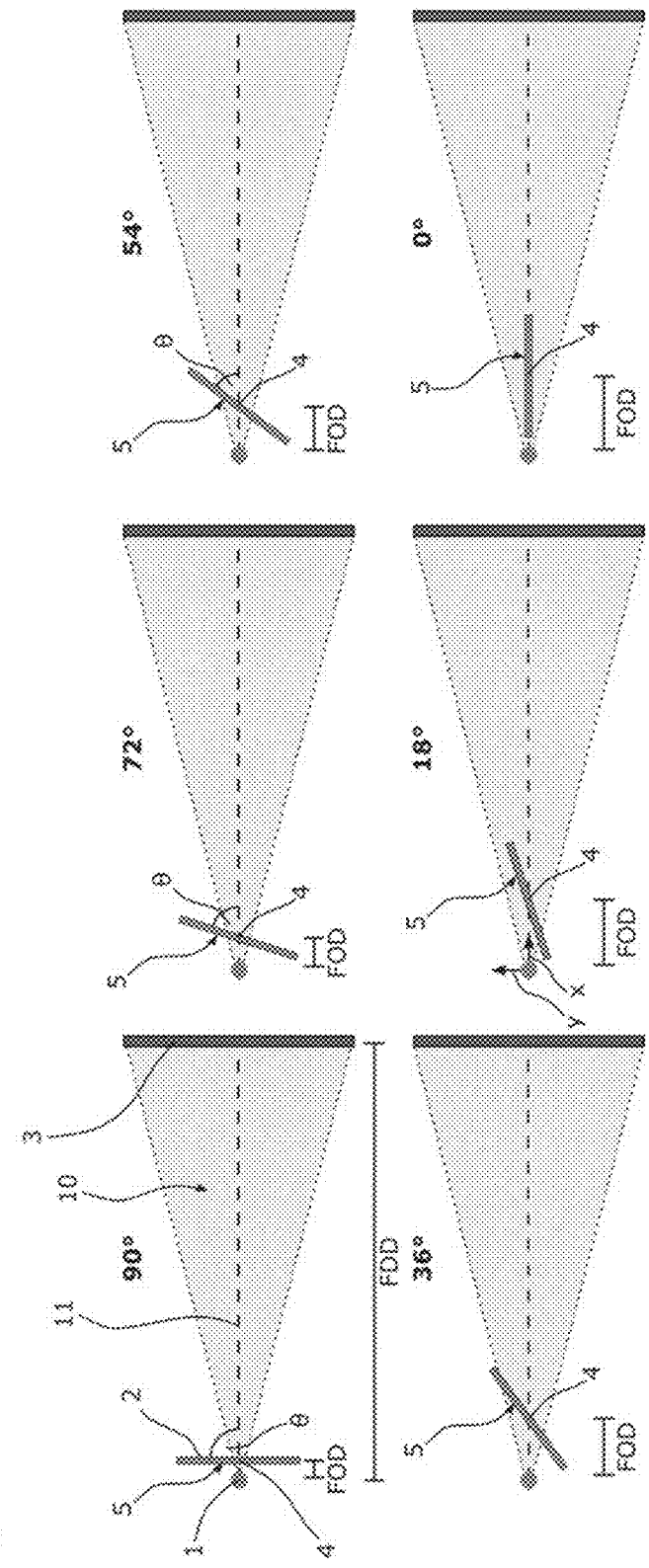
FIG. 1 shows a schematic representation of an example according to some embodiments in which the orientation of the imaging components for specific, equidistant angles of rotation.

In FIG. 1 an X-ray system can be seen schematically, in which an object 2 to be examined is represented in six different positions according to a procedure according to some embodiments. The X-ray system has a tube with a focus, which are uniformly given the reference number 1, as—as already stated above—the imaging properties when the procedure according to the disclosed embodiments is carried out and during the subsequent reconstruction of an examined volume 5 (also referred to as ROI=Region of Interest) of the object 2 do not depend on a differentiation between these two.

The X-ray system which is used to carry out the procedure according to the disclosed embodiments is known from the state of the art, with the result that only the constituents relevant to the disclosed embodiments and their function are discussed here.

An X-ray in the form of a fan or cone beam 10, which strikes a detector 3 arranged at a fixed distance to the focus, emanates from the focus 1. This fixed distance is referred to as FDD. The detector 3 is struck perpendicularly by a central ray 11 of the fan or cone beam 10. Whether a fan beam 10 or a cone beam 10 is used depends on whether information is to be obtained only in one dimension or in two dimensions. The detector 3 is matched to the type of X-ray: a line detector is used in the case of a fan beam 10 and an area detector is used in the case of a cone beam 10.

The focus 1 forms the origin of a Cartesian coordinate system, wherein the x axis corresponds to the central ray 11 (thus extends horizontally in FIG. 1), the y axis extends vertically upwards in FIG. 1 and the z axis is perpendicular to the plane of the page and points upwards therefrom.

The object 2 to be examined is fixed on a manipulator (not represented). The manipulator can move translationally along the x axis and rotate about a rotational axis 4 oriented parallel to the z axis. In the embodiment example represented it is not necessary for the manipulator also to be able to move translationally parallel to the y axis, as the object 2 is fixed on the manipulator such that its volume to be examined is arranged around the rotational axis 4 of the manipulator. In order to place the volume 5 around the central ray 11 when each individual fluoroscopic image is created while the entire procedure according to the disclosed embodiments is being carried out, the rotational axis 4 accordingly need not be displaced in the y direction.

As the object 2—as stated above—is a flat structure (the object extends multiple times further in two dimensions than in its third dimension), the distance between focus 1 and object 2 on the x axis (thus the volume to be examined) can be varied depending on the angle of rotation □ of the rotational axis 4 (this is the angle between the extent of the object 2 in its surface parallel to the xy plane and the x axis). This follows from the fact that when the object 2 is rotated about the rotational axis 4 a collision with the tube 1 must not result and, because of the small extent in the direction of its depth, the object 2 can be brought closer to the focus 1 in the region of the angle of rotation □=90° than in the region of the angle of rotation □=0°. The variable distance between focus 1 and axis of rotation 4 of the object 2 is referred to as FOD. The aim of the procedure according to the disclosed embodiments is for the magnification (FDD/FOD) of the volume 5 to be as large as possible at every individual angle of rotation □. The variation in the FOD is shown in FIG. 1 resulting from this by way of example for six angles of rotation of from □=90° to □=0° at constant angle increments of 18°.

Figure 2:
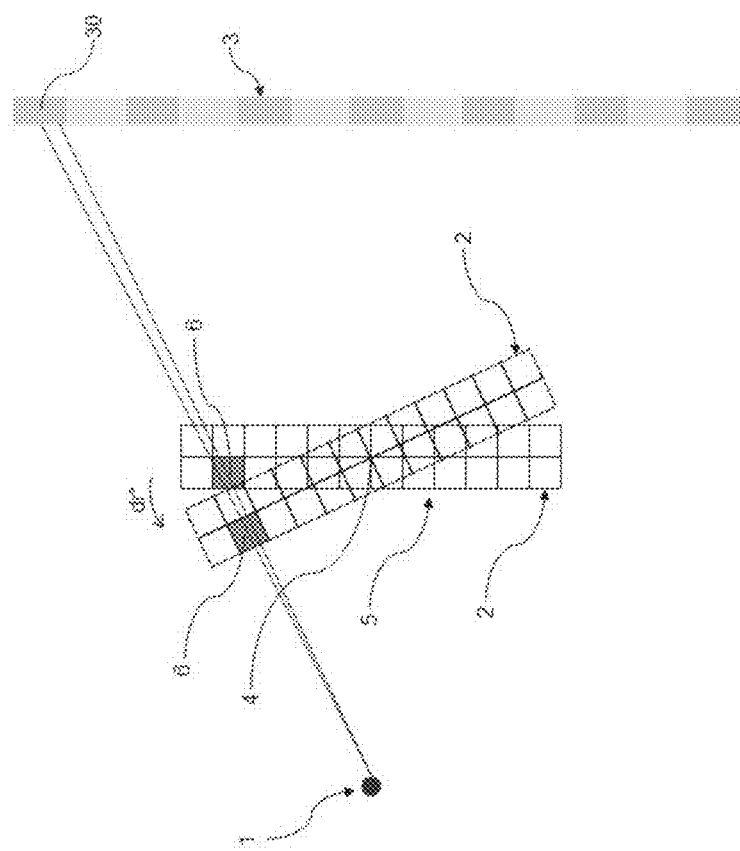
FIGS. 2-4 are explanatory representations of the reasons for the different angle increments.
Figure 3:
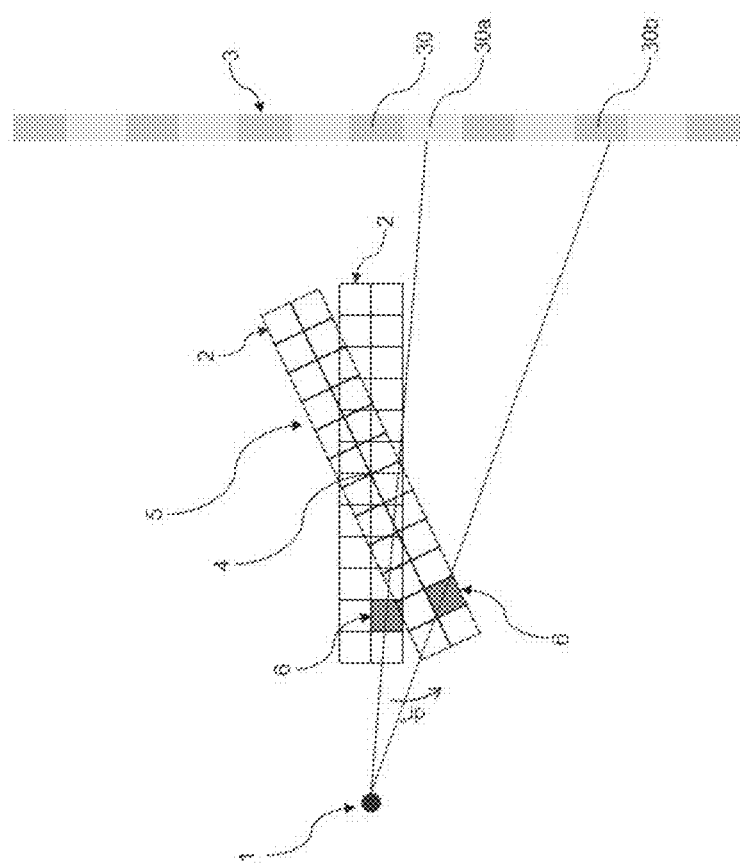
Figure 4:
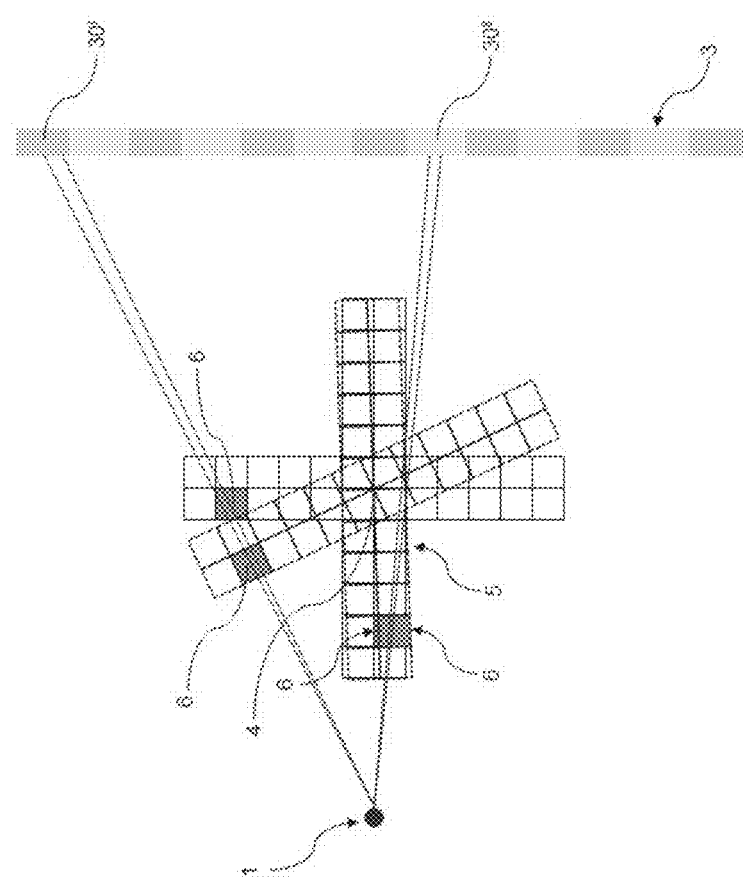

This procedure referred to in the state of the art as a CT procedure with variable magnification, in which constant angle increments are used between the creation of successive fluoroscopic images (see left-hand part of FIG. 5), is modified by the procedure according to the disclosed embodiments. FIGS. 2-4 are intended to better understand the idea behind the modification according to the disclosed embodiments.

In these figures, by way of example, a voxel 6—thus a volume element—of the volume 5 is represented clearly outside the rotational axis 4, in order that the underlying geometric relationships are better recognizable.

FIG. 2 shows the situation during the creation of two successive fluoroscopic images of a voxel 6 of the same volume 5 during a rotation by an angle increment dr° about the rotational axis 4. The angle of rotation □ lies in the region of 90°, corresponding to the representation in the top left image of FIG. 1. The structure of the detector 3 is shown in more detail, with the result that its detector elements 30 are to be recognized. The position of the projection of the voxel 6 in the two positions represented on the detector 3 barely changes, in particular the two projections lie in the same detector element 30.

In FIG. 3, in contrast to FIG. 2, a situation is represented such as results during the creation of two successive fluoroscopic images by an angle increment dr° the same size as in FIG. 2 about the rotational axis 4. The angle of rotation □ here, however, lies in the region of 0°, corresponding to the representation in the bottom right image of FIG. 1. Despite the absolute change in the angle of rotation □ being identical to FIG. 2 because of the equal angle increment dr°, there is a much greater effect on the projection of the voxel 6; the projections here do not lie on the same detector element 30, but on several detector elements 30a, 30b from each other.

In order to achieve a similar sampling in the angle of rotation range shown in FIG. 3 to that in the angle of rotation range shown in FIG. 2, in the case represented in FIG. 3 (region around □=0) a smaller angle increment dr° would have to be used. This is represented in FIG. 4. In the case of conventional CT, the selection of the angle increments dr° is always geared to the case according to FIG. 3, as parts of the volume 5 lie in this front region at every angle of rotation □. In the case of flat objects 2, such as for example printed circuit boards—the same also applies quite generally to objects 2 that are not round—conversely projections and thus time and dose for the creation of fluoroscopic images can therefore be omitted if the object 2 is located in the region shown in FIG. 2 of the angle of rotation □ (thus at 90°).

Figure 5:
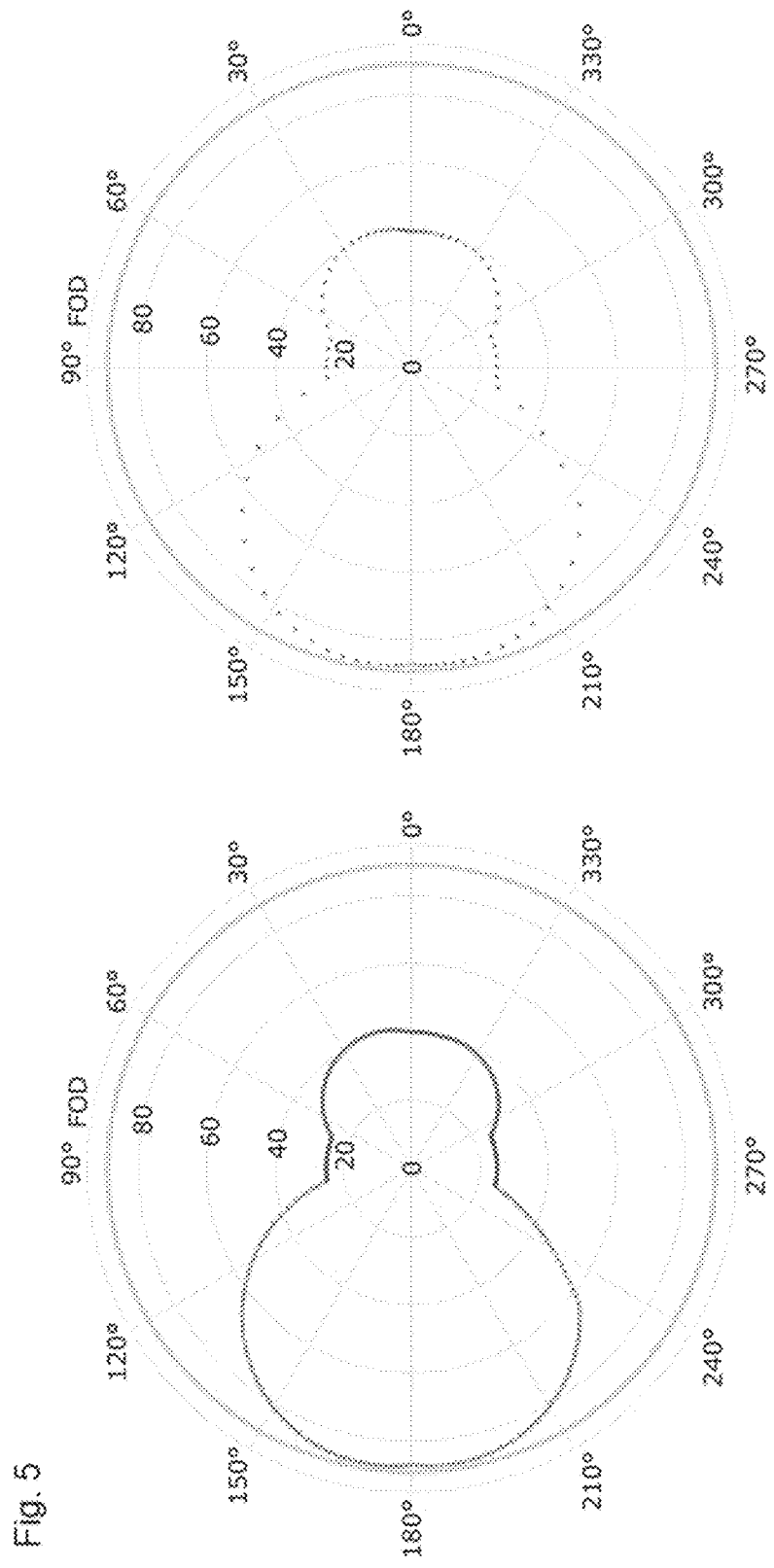
FIG. 5 is a comparison of the FOD depending on the angle of rotation in the case of a known CT with variable magnification and a procedure according to some embodiments.

According to the disclosed embodiments the angle increments dr° can thus be chosen to be significantly larger in the region of the angle of rotation □ of 90° and 270° than in the region of the angle of rotation □ of 0° and 180°. This is represented in FIG. 5. In the left-hand part, the FOD is depicted depending on the angle of rotation □ for the CT procedure with variable magnification known from the state of the art and already described above for an object 2 according to the definition in the context of this application (extent multiple times further in two dimensions than in the third dimension). In the right-hand part of FIG. 5, on the other hand, the corresponding is represented for a procedure according to the disclosed embodiments for the same object 2. Each point in the images corresponds to a position in which the generation of a fluoroscopic image is effected. It can easily be recognized that, although in the procedure according to the disclosed embodiments approximately equal angle increments dr° to those in the right-hand part are used for angles of rotation □ which lie in the regions around 0° and 180°, in the other angle ranges, in particular for angles of rotation □ which lie in the regions around 90° and 270°, the angle increments dr° in the procedure according to the disclosed embodiments are significantly larger than in the state of the art. This has the result that considerably fewer fluoroscopic images have to be made in order to make a reconstruction of the volume 5 of the object possible. As a result, for one thing, time is saved as fewer positions need to be reached, in which fluoroscopic images have to be generated (and the time for the creation of same is likewise dispensed with), and also less dose burden occurs on the volume 5, with the result that the risk of damage to the object 2 is reduced. The quality of the reconstruction of the volume 5, on the other hand, barely suffers compared with the procedures known from the state of the art.

For the example according to the embodiments represented in FIG. 5, the fluoroscopic images were created at the following angle increments dr° starting from the angle of rotation □=0° (in each case with the measuring unit ° omitted): 0.701000, 0.701000, 0.700000, 0.701000, 0.700000, 0.700000, 0.700000, 0.700000, 0.699000, 0.698000, 0.698000, 0.697000, 0.697000, 0.696000, 0.695000, 0.695000, 0.693000, 0.693000, 0.692000, 0.690000, 0.690000, 0.688000, 0.687000, 0.685000, 0.685000, 0.683000, 0.681000, 0.680000, 0.679000, 0.677000, 0.675000, 0.673000, 0.672000, 0.670000, 0.668000, 0.666000, 0.664000, 0.662000, 0.660000, 0.658000, 0.655000, 0.654000, 0.651000, 0.648000, 0.647000, 0.644000, 0.641000, 0.639000, 0.636000, 0.634000, 0.631000, 0.628000, 0.626000, 0.623000, 0.620000, 0.617000, 0.614000, 0.611000, 0.608000, 0.605000, 0.602000, 0.599000, 0.596000, 0.592000, 0.589000, 0.586000, 0.583000, 0.579000, 0.576000, 0.572000, 0.569000, 0.566000, 0.562000, 0.558000, 0.555000, 0.551000, 0.548000, 0.544000, 0.540000, 0.537000, 0.532000, 0.529000, 0.525000, 0.522000, 0.517000, 0.514000, 0.509000, 0.506000, 0.502000, 0.498000, 0.493000, 0.490000, 0.486000, 0.482000, 0.478000, 0.473000, 0.470000, 0.466000, 0.461000, 0.457000, 0.453000, 0.449000, 0.445000, 0.441000, 0.437000, 0.432000, 0.428000, 0.424000, 0.420000, 0.416000, 0.411000, 0.408000, 0.403000, 0.398000, 0.395000, 0.391000, 0.386000, 0.382000, 0.378000, 0.374000, 0.369000, 0.365000, 0.362000, 0.357000, 0.353000, 0.348000, 0.345000, 0.341000, 0.336000, 0.332000, 0.328000, 0.325000, 0.320000, 0.316000, 0.312000, 0.308000, 0.304000, 0.300000, 0.296000, 0.292000, 0.289000, 0.284000, 0.281000, 0.276000, 0.273000, 0.269000, 0.266000, 0.261000, 0.258000, 0.254000, 0.251000, 0.247000, 0.243000, 0.240000, 0.236000, 0.233000, 0.230000, 0.225000, 0.223000, 0.219000, 0.216000, 0.212000, 0.209000, 0.206000, 0.203000, 0.200000, 0.197000, 0.193000, 0.191000, 0.187000, 0.185000, 0.181000, 0.179000, 0.176000, 0.174000, 0.170000, 0.168000, 0.165000, 0.163000, 0.160000, 0.157000, 0.156000, 0.152000, 0.151000, 0.148000, 0.146000, 0.143000, 0.142000, 0.139000, 0.138000, 0.135000, 0.133000, 0.132000, 0.129000, 0.128000, 0.126000, 0.125000, 0.123000, 0.121000, 0.120000, 0.118000, 0.117000, 0.115000, 0.114000, 0.113000, 0.112000, 0.111000, 0.109000, 0.109000, 0.108000, 0.106000, 0.106000, 0.105000, 0.104000, 0.104000, 0.103000, 0.103000, 0.102000, 0.101000, 0.101000, 0.101000, 0.101000, 0.100000, 0.100000, 0.101000, 0.100000, 0.100000, 0.100000, 0.100000, 0.101000, 0.101000, 0.101000, 0.102000, 0.102000, 0.102000, 0.103000, 0.104000, 0.104000, 0.105000, 0.106000, 0.107000, 0.107000, 0.109000, 0.109000, 0.111000, 0.112000, 0.113000, 0.114000, 0.115000, 0.117000, 0.119000, 0.119000, 0.121000, 0.123000, 0.125000, 0.126000, 0.128000, 0.129000, 0.132000, 0.133000, 0.136000, 0.137000, 0.139000, 0.142000, 0.144000, 0.145000, 0.148000, 0.151000, 0.153000, 0.155000, 0.157000, 0.160000, 0.163000, 0.165000, 0.168000, 0.171000, 0.173000, 0.176000, 0.179000, 0.181000, 0.185000, 0.188000, 0.190000, 0.194000, 0.196000, 0.200000, 0.203000, 0.206000, 0.209000, 0.212000, 0.216000, 0.219000, 0.223000, 0.226000, 0.229000, 0.233000, 0.236000, 0.240000, 0.243000, 0.247000, 0.251000, 0.254000, 0.258000, 0.261000, 0.266000, 0.269000, 0.273000, 0.277000, 0.280000, 0.285000, 0.288000, 0.292000, 0.296000, 0.300000, 0.304000, 0.308000, 0.312000, 0.316000, 0.321000, 0.324000, 0.328000, 0.332000, 0.337000, 0.340000, 0.345000, 0.349000, 0.352000, 0.357000, 0.362000, 0.365000, 0.370000, 0.373000, 0.378000, 0.382000, 0.387000, 0.390000, 0.395000, 0.399000, 0.403000, 0.407000, 0.411000, 0.416000, 0.420000, 0.424000, 0.428000, 0.433000, 0.436000, 0.441000, 0.445000, 0.449000, 0.453000, 0.457000, 0.462000, 0.465000, 0.470000, 0.473000, 0.478000, 0.482000, 0.486000, 0.490000, 0.494000, 0.497000, 0.502000, 0.506000, 0.510000, 0.513000, 0.518000, 0.521000, 0.525000, 0.529000, 0.533000, 0.536000, 0.540000, 0.544000, 0.548000, 0.551000, 0.555000, 0.558000, 0.562000, 0.566000, 0.569000, 0.572000, 0.576000, 0.579000, 0.583000, 0.586000, 0.589000, 0.592000, 0.596000, 0.599000, 0.602000, 0.605000, 0.608000, 0.611000,
0.614000, 0.617000, 0.620000, 0.623000, 0.626000,
0.628000, 0.631000, 0.634000, 0.636000, 0.639000,
0.641000, 0.644000, 0.647000, 0.648000, 0.652000,
0.653000, 0.655000, 0.658000, 0.660000, 0.662000,
0.664000, 0.666000, 0.668000, 0.670000, 0.672000,
0.673000, 0.675000, 0.677000, 0.679000, 0.680000,
0.681000, 0.683000, 0.685000, 0.685000, 0.687000,
0.689000, 0.689000, 0.691000, 0.691000, 0.693000,
0.693000, 0.695000, 0.695000, 0.696000, 0.697000,
0.697000, 0.698000, 0.699000, 0.699000, 0.699000,
0.700000, 0.700000, 0.700000, 0.701000, 0.701000,
0.700000, 0.701000, 0.701000, 0.701000, 0.700000,
0.700000, 0.700000, 0.700000, 0.699000, 0.699000,
0.698000, 0.698000, 0.697000, 0.696000, 0.696000,
0.695000, 0.694000, 0.693000, 0.692000, 0.691000,
0.690000, 0.689000, 0.687000, 0.687000, 0.685000,
0.684000, 0.682000, 0.681000, 0.679000, 0.677000,
0.677000, 0.674000, 0.672000, 0.671000, 0.669000,
0.667000, 0.665000, 0.663000, 0.661000, 0.659000,
0.657000, 0.654000, 0.652000, 0.650000, 0.648000,
0.645000, 0.643000, 0.640000, 0.638000, 0.635000,
0.632000, 0.630000, 0.627000, 0.624000, 0.621000,
0.619000, 0.615000, 0.613000, 0.609000, 0.607000,
0.604000, 0.600000, 0.597000, 0.594000, 0.591000,
0.588000, 0.584000, 0.581000, 0.578000, 0.574000,
0.570000, 0.568000, 0.563000, 0.561000, 0.556000,
0.553000, 0.550000, 0.545000, 0.542000, 0.539000,
0.534000, 0.531000, 0.527000, 0.523000, 0.520000,
0.515000, 0.512000, 0.508000, 0.503000, 0.500000,
0.496000, 0.492000, 0.488000, 0.484000, 0.479000,
0.476000, 0.472000, 0.467000, 0.464000, 0.459000,
0.455000, 0.451000, 0.447000, 0.443000, 0.439000,
0.434000, 0.431000, 0.426000, 0.422000, 0.417000,
0.414000, 0.409000, 0.406000, 0.401000, 0.396000,
0.393000, 0.388000, 0.384000, 0.380000, 0.376000,
0.372000, 0.367000, 0.364000, 0.359000, 0.355000,
0.351000, 0.346000, 0.343000, 0.338000, 0.335000,
0.330000, 0.326000, 0.322000, 0.318000, 0.314000,
0.310000, 0.306000, 0.302000, 0.299000, 0.294000,
0.290000, 0.286000, 0.283000, 0.278000, 0.275000,
0.271000, 0.267000, 0.264000, 0.260000, 0.256000,
0.252000, 0.249000, 0.245000, 0.242000, 0.238000,
0.234000, 0.231000, 0.228000, 0.224000, 0.221000,
0.217000, 0.214000, 0.211000, 0.208000, 0.204000,
0.202000, 0.198000, 0.195000, 0.192000, 0.189000,
0.186000, 0.183000, 0.180000, 0.178000, 0.174000,
0.172000, 0.169000, 0.167000, 0.164000, 0.161000,
0.159000, 0.156000, 0.154000, 0.152000, 0.149000,
0.147000, 0.145000, 0.142000, 0.141000, 0.138000,
0.136000, 0.135000, 0.132000, 0.131000, 0.129000,
0.127000, 0.125000, 0.123000, 0.123000, 0.120000,
0.119000, 0.118000, 0.116000, 0.115000, 0.113000,
0.112000, 0.112000, 0.110000, 0.109000, 0.108000,
0.107000, 0.106000, 0.106000, 0.104000, 0.104000,
0.104000, 0.102000, 0.103000, 0.101000, 0.102000,
0.101000, 0.101000, 0.100000, 0.100000, 0.100000,
0.101000, 0.100000, 0.100000, 0.100000, 0.101000,
0.100000, 0.101000, 0.102000, 0.101000, 0.103000,
0.102000, 0.104000, 0.104000, 0.104000, 0.106000,
0.106000, 0.107000, 0.108000, 0.109000, 0.110000,
0.112000, 0.112000, 0.114000, 0.114000, 0.117000,
0.117000, 0.119000, 0.121000, 0.122000, 0.123000,
0.126000, 0.127000, 0.128000, 0.131000, 0.132000,
0.135000, 0.136000, 0.138000, 0.141000, 0.142000,
0.145000, 0.147000, 0.149000, 0.152000, 0.154000,
0.156000, 0.159000, 0.161000, 0.164000, 0.167000,
0.169000, 0.172000, 0.175000, 0.177000, 0.180000,
0.183000, 0.186000, 0.189000, 0.192000, 0.195000,
0.199000, 0.201000, 0.204000, 0.208000, 0.211000,
0.214000, 0.217000, 0.221000, 0.224000, 0.228000,
0.231000, 0.234000, 0.238000, 0.242000, 0.245000,
0.249000, 0.252000, 0.256000, 0.260000, 0.264000,
0.267000, 0.271000, 0.275000, 0.278000, 0.283000,
0.286000, 0.290000, 0.295000, 0.298000, 0.302000,
0.306000, 0.310000, 0.314000, 0.318000, 0.322000,
0.326000, 0.331000, 0.334000, 0.338000, 0.343000,
0.347000, 0.350000, 0.355000, 0.360000, 0.363000,
0.367000, 0.372000, 0.376000, 0.380000, 0.384000,
0.388000, 0.393000, 0.397000, 0.401000, 0.405000,
0.409000, 0.414000, 0.417000, 0.422000, 0.427000,
0.430000, 0.434000, 0.439000, 0.443000, 0.447000,
0.451000, 0.455000, 0.459000, 0.464000, 0.467000,
0.472000, 0.476000, 0.480000, 0.483000, 0.488000,
0.492000, 0.496000, 0.500000, 0.504000, 0.507000,
0.512000, 0.515000, 0.520000, 0.523000, 0.527000,
0.531000, 0.534000, 0.539000, 0.542000, 0.546000,
0.549000, 0.553000, 0.557000, 0.560000, 0.563000,
0.568000, 0.570000, 0.575000, 0.577000, 0.581000,
0.584000, 0.588000, 0.591000, 0.594000, 0.597000,
0.601000, 0.603000, 0.607000, 0.609000, 0.613000,
0.616000, 0.618000, 0.621000, 0.625000, 0.627000,
0.629000, 0.633000, 0.635000, 0.637000, 0.640000,
0.643000, 0.645000, 0.648000, 0.650000, 0.652000,
0.654000, 0.657000, 0.659000, 0.661000, 0.663000,
0.665000, 0.667000, 0.669000, 0.671000, 0.672000,
0.675000, 0.676000, 0.677000, 0.680000, 0.680000,
0.683000, 0.683000, 0.685000, 0.687000, 0.687000,
0.689000, 0.690000, 0.691000, 0.692000, 0.693000,
0.694000, 0.695000, 0.696000, 0.696000, 0.697000,
0.698000, 0.698000, 0.699000, 0.699000, 0.700000,
0.700000, 0.700000, 0.701000, 0.700000, 0.701000; in the procedure represented in the left-hand part of FIG. 5, on the other hand, a constant angle increment of 0.8° was used.

For a person skilled in the art it is self-evident that the above-described movement of the object 2 and the rotational axis 4 with stationary tube 1 and stationary detector 3 can be achieved with the same result by a kinematic inversion. Here, the object 2 is stationary and the imaging system having of tube 1 and detector 3 move correspondingly around the object 2, as is described as an alternative solution in the general description of the disclosed embodiments. A person skilled in the art does not need more detailed statements regarding a corresponding embodiment example, as such designs are known from medical technology in the case of CT systems, wherein a modification is effected here, however, to the effect that the rotation of a frame, referred to as a gantry there, in the present invention is not effected about an always identical axis of rotation, but rather about a virtual axis of rotation which moves corresponding to the above statements and the specifications in the appended claims.

LIST OF REFERENCE SIGNS

1 (X-ray) tube/focus
2 object
3 (X-ray) detector
4 rotational axis
5 volume
6 voxel
10 X-ray (fan or cone beam)
11 central ray
30 detector element 30a detector element
30b detector element
30' detector element
30" detector element
Θ angle of rotation
dr° angle increment

The invention claimed is:

1. A procedure for generating fluoroscopic images for reconstruction of a volume in a flat object using an X-ray system, which has three imaging components, a tube, a detector, and a manipulator, located between them, on which the flat object is fixed,
    wherein the flat object extends multiple times further in two dimensions—called surface area—than in its third dimension—called thickness—wherein the tube has a focus, which, in a central position of the tube, forms a coordinate origin of a Cartesian coordinate system, and which emits an X-ray, wherein a vector from the tube through the volume forms an x axis of the coordinate system and a z axis is perpendicular to a vector formed through the thickness,
    wherein the manipulator is rotated about a rotational axis, which is perpendicular to the x axis, runs parallel to the z axis and is displaceable parallel to the x axis,
    wherein the rotational axis extends through the volume each time a fluoroscopic image is generated,
    wherein a distance between the tube and the rotational axis is altered such that when the flat object is rotated about the rotational axis, the flat object has as small as possible a distance to the tube at every angle of rotation (Θ), wherein the distance does not fall below a definable minimum distance,
    wherein fluoroscopic images are made at predefinable angles of rotation (Θ) and angle increments (dr°) between neighbouring predefinable angles of rotation (Θ) are larger in case of smaller distances of the rotational axis from the tube than in case of larger distances of the rotational axis from the tube.

2. The procedure according to claim 1, wherein the flat object is fixed on the manipulator before a start of the procedure such that the volume lies on the rotational axis of the manipulator.

3. The procedure according to claim 1, wherein the volume is positioned for each angle increment (dr°) by means of a movement of the manipulator along the x axis and/or a y axis such that a resultant effective rotational axis lies in the volume.

4. The procedure according to claim 1, wherein the x axis does not strike the detector centrally.

5. The procedure according to claim 1, wherein a ratio between a maximum and a minimum angle increment (dr°) corresponds to a ratio of an object width to an object depth.

6. The procedure according to claim 1, wherein the angle increments (dr°) are altered inversely to the distance of the rotational axis from the tube.

7. The procedure according to claim 1, wherein the distance between the flat object and the tube for each angle increment (dr°) is between 0.1 and 20 mm.

8. The procedure according to claim 1, wherein the flat object is an electronic component part.

9. A procedure for generating fluoroscopic images for reconstruction of a volume in a flat object using an X-ray system, which has three imaging components, a tube, a detector, and an object holder, located between them, on which the flat object is fixed,
    wherein the flat object extends multiple times further in two dimensions—called surface area—than in its third dimension—called thickness—wherein the tube has a focus, which, in a central position of the tube, forms a coordinate origin of a Cartesian coordinate system, and which emits an X-ray, wherein a vector from the tube through the volume forms the an axis of the coordinate system and a z axis is perpendicular to a vector formed through the thickness,
    wherein a position and orientation of the tube and the detector relative to each other always remain the same and the combination of the tube and the detector is referred to as an imaging system,
    wherein the imaging system is rotated about an axis of rotation, which is perpendicular to the x axis, runs parallel to the z axis and is displaceable parallel to the x axis,
    wherein the axis of rotation extends through the volume each time a fluoroscopic image is generated,
    wherein a distance between the tube and the axis of rotation is altered such that when the imaging system is rotated about the axis of rotation, the flat object has as small as possible a distance to the tube at every angle of rotation (Θ), wherein the distance does not fall below a definable minimum distance,
    wherein fluoroscopic images are made at predefinable angles of rotation (Θ) and angle increments (dr°) between neighbouring predefinable angles of rotation (Θ) are larger in case of smaller distances of the axis of rotation from the tube than in case of larger distances of the axis of rotation from the tube.

10. The procedure according to claim 9, wherein the tube and the detector are fixed on a frame, which is rotatable about an axis oriented parallel to the z axis and is displaceable along the x axis.

11. The procedure according to claim 9, wherein the volume is positioned for each angle increment (dr°) by means of a movement of the imaging system along the x axis such that a resultant effective axis of rotation lies in the volume.

12. The procedure according to claim 9, wherein a central ray of the X-ray lies on the x axis and strikes the detector perpendicularly in a central position.

13. The procedure according to claim 9, wherein the x axis does not strike the detector centrally.

14. The procedure according to claim 9, wherein a ratio between a maximum and a minimum angle increment (dr°) corresponds to a ratio of an object width to an object depth.

15. The procedure according to claim 9, wherein the angle increments (dr°) are altered inversely to the distance of the axis of rotation from the tube.

16. The procedure according to claim 9, wherein the distance between the flat object and the tube for each angle increment (dr°) is between 0.1 and 20 mm.

17. The procedure according to claim 9, wherein a predefinable shortest distance between the tube and the rotational axis or between the tube and the axis of rotation is not fallen below.

18. The procedure according to claim 9, wherein the minimum distance is chosen to be at least large enough that the volume is always completely illuminated.

19. The procedure according to claim 18, wherein the minimum distance is fixed before a start of the rotation.

20. The procedure according to claim 9, wherein the flat object is an electronic component part.

* * * * *